Feb. 9, 1965 S. L. PASTOR 3,169,032
MEANS FOR ATTACHING A KNOB OR THE LIKE TO A SHAFT
Filed Nov. 30, 1962
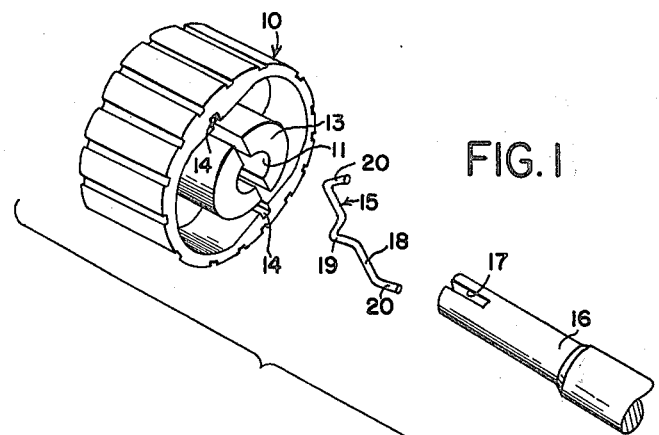
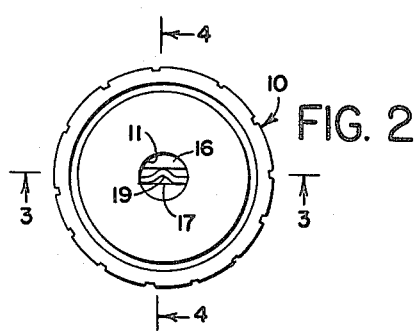
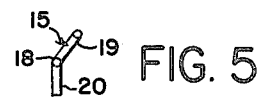
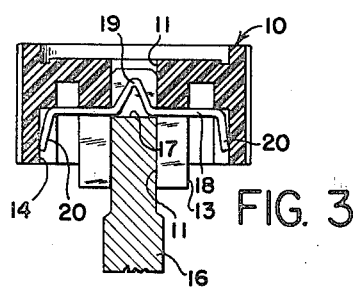
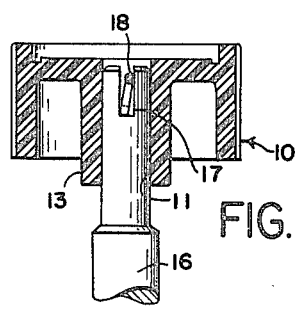
INVENTOR.
SHELDON LEE PASTOR
BY
Carpenter Abbott Coulter & Kinney
ATTORNEYS 3,169,032
MEANS FOR ATTACHING A KNOB OR THE LIKE
TO A SHAFT
Sheldon Lee Pastor, Chicago, Ill., assignor, by mesne assignments, to Minnesota Mining and Manufacturing Company, St. Paul, Minn., a corporation of Delaware
Filed Nov. 30, 1962, Ser. No. 241,189
3 Claims. (Cl. 287—53)

This invention relates to a detachable connecting means and more particularly relates to a simple releasable torque-taking connection between a control knob and a driven shaft.

The prior art is replete with devices which detachably connect a removable knob with an apparatus control shaft. Previously these devices have been designed such that the fastening device will hold the knob tightly on a shaft for the life of the apparatus. However, in many instances this has not been true because of the materials used or the construction of fastening means. The use of leaf springs in fastening devices of this nature have proven to be unsatisfactory as each time the spring is flexed the flexure takes place in a localized area such that within a relatively short period of time the spring breaks or becomes permanently deformed such that it no longer has sufficient resilience to hold the members together. Other forms of springs have been used in these devices, but when used they have all been adapted for bending movement much as a leaf spring, thus not increasing the life of the fastening device or increasing its effectiveness.

The present invention provides a simple, low cost fastening device utilizing a torsion effect in a spring to give the device increased effectiveness. The spring of the present invention is formed from spring wire stock in a manner such that there is no waste of material and no special tooling is required to form the spring member. Additional heat treatment of the formed spring is unnecessary due to the material used decreasing the operations necessary in forming said member. The torsion bar effect used with the present invention gives increased life to the knob fastening device and the torsion bar action allows greater manufacturing tolerances to exist between the several parts without decreasing the effectiveness of the attaching means, e.g., the size of the slot in the driven shaft may vary relative to the diameter of the wire stock.

These and other aspects of the present invention will become more apparent as this description proceeds when read in conjunction with the attached drawing wherein:

FIGURE 1 is an exploded view of a knob, a slotted shaft and a device constructed in accordance with the invention for securing said knob to said shaft;

FIGURE 2 is a plan view of the knob secured on said shaft;

FIGURE 3 is a vertical sectional view taken along the line 3—3 of FIGURE 2;

FIGURE 4 is a vertical sectional view taken substantially along the line 4—4 of FIGURE 2; and FIGURE 5 is a side elevation view of the fastening device.

Referring to the drawing in detail, a knob or driving member 10, formed of plastic or other suitable material, is provided with a central bore 11 and a central protuberance 13. The knob 10 and the protuberance 13 are provided with recess means 14 extending diametrically with respect to the central bore 11 for receiving a torsion spring 15. The recess means 14 has axially extending end-wall portions formed in the knob 10 and is further defined by grooves in the central protuberance 13. The end-wall portions of the recess 14 serve as means for positioning the spring 15.

The driven shaft 16 has one end formed to slidably fit within the central bore 11 of the knob 10 as shown in FIGURES 3 and 4, and is provided at said one end with bifurcations defining an axially extending, diametric slot 17 between flat surfaces of said bifurcations. The slot 17 has a width corresponding generally to that of the recess 14 formed in the knob 10.

In accordance with the present invention, the torsion spring 15 affords a releasable torque-taking connection between the knob 10 and shaft 16. The spring 15 is formed of steel music wire which is circular in cross-section and may be cut and formed in a simple manner, for example, on a four-slide horizontal press. The spring 15 has an elongate main body portion 18. The main body portion 18 has an offset portion 19 of generally U-shape formed centrally thereof and has opposite end portions 20 diverging from said main body portion. The end portions 20 are formed such that they both lie in a single plane. This plane is angularly related however with the plane in which the offset central portion 19 is positioned, as shown most clearly in FIGURE 5.

In assembled relation the spring 15 is placed in the recess 14 formed in the knob 10. As the spring 15 is moved into place the end portions 20 frictionally and resiliently engage the opposite end walls of the recess 14 which is slightly wider than the diameter of the wire stock. The sharp edges of the end portions 20 engaging the walls of the recess 14 aid to hold the spring 15 in place. When in position, the center portion 19 of the spring 15 is disposed in the bore 11 and lies in a plane forming an acute angle with the axis of said bore. As the shaft 16 is moved into bore 11, the bifurcations fit about the spring 15 with one of the bifurcations engaging the offset central portion 19, urging it counterclockwise to the position illustrated in FIGURE 4. This rotation places a torsional stress in the main body portion 18 such that the central portion bears resiliently against the bifurcation to hold the knob 10 upon the shaft. This spring device 15 thus establishes a driving and retaining connection between the knob and driven shaft.

While one embodiment of the invention has been shown and described, it will be appreciated that certain modifications may be made without departing from the spirit and scope of the invention. For instance, the indented areas in the knob 10 adjacent the end portions 20 may be so formed to lock the spring 15 against axial displacement or an indentation may be formed in at least one of the bifurcations of the shaft 16 to receive the bight of the central portion 19 aiding to lock the shaft against axial displacement.

What is claimed is:

1. In combination, a driven shaft provided at one end with bifurcations defining an axially extending diametric slot between said bifurcations, a driving member provided with a center bore in which said one end of said shaft is slidably received and provided with an elongated recess formed with axially extending end-walls and extending diametrically relative to and communicating with said bore, and a torsion member formed of wire stock comprising an elongate main body portion having opposite diverging end portions and a generally U-shaped offset central portion, said torsion member being disposed in said recess and having said opposite end portions frictionally engaging said end-walls, said end portions lying in a first plane and said offset central portion being normally disposed in a second plane but urged toward said first plane when received between said bifurcations of the shaft to bear resiliently thereagainst due to the torsional stress applied to said main body portion affording a driving and retaining connection between said driven shaft and said driving member.

2. In combination, a shaft provided at one end with an axially extending generally diametric planar surface portion, a knob provided with a bore in which said one end of said shaft is slidably received and provided with an elongated recess extending across and communicating with said bore and having the ends of said recess terminating in end-walls extending axially relative to said bore, and a torsion member formed of wire stock circular in cross-section comprising an elongate main body portion having opposite end portions and a generally U-shaped offset central portion, said torsion member being disposed in said recess and bore with said opposite end portions resiliently engaging said end-walls, said end portions lying in a first plane and said offset central portion being normally disposed in a second plane and urged toward said first plane by said one end of said shaft being positioned in said bore with said planar surface portion extending parallel to said elongate body portion such that said offset portion bears against said planar surface due to the torsional stress applied to said main body portion affording a driving and retaining connection between said shaft and said knob.

3. In combination, a shaft formed at one end with an axially extending planar surface portion; a knob having opposed sides and formed with a bore extending between said opposed sides to slidably receive therein said one end of said shaft and formed with a recess in one side extending across said bore and which has opposed end walls extending generally parallel with the axis of said bore; and a spring retaining member formed of spring wire stock circular in cross-section and comprising an elongate body portion positioned in said recess, a U-shaped offset portion formed in said main body portion and disposed in said bore in a plane intersecting the axis of said bore and bearing resiliently against said planar surface portion of said shaft due to torsional stress placed in said main body portion upon insertion of said one end of said shaft into said bore, and divergent end portions formed one on each end of said main body portion, said end portions terminating in sharp edges which are resiliently urged into engagement with the end walls of said recess such that said sharp edges retain said retaining member in said knob and said offset portion of said member frictionally retains said knob on said shaft.

References Cited by the Examiner
UNITED STATES PATENTS

| | | |
|---|---|---|
| 2,153,919 | 4/39 | Forsythe. |
| 2,153,950 | 4/39 | Whinery. |
| 2,634,992 | 4/53 | Nelson. |
| 2,805,876 | 9/57 | Aylor et al. |

FOREIGN PATENTS

| | | |
|---|---|---|
| 174,159 | 3/35 | Switzerland. |

CARL W. TOMLIN, *Primary Examiner.*